United States Patent
Clarke et al.

[11] Patent Number: 5,846,393
[45] Date of Patent: Dec. 8, 1998

[54] ELECTROCHEMICALLY-AIDED BIODIGESTION OF ORGANIC MATERIALS

[75] Inventors: Robert L. Clarke, Orinda, Calif.; Reinout Lageman, Nootdorp; Wieberen Pool, Groningen, both of Netherlands; Stephen R. Clarke, Orinda, Calif.

[73] Assignee: Geo-Kinetics International, Inc., Orinda, Calif.

[21] Appl. No.: 660,115

[22] Filed: Jun. 7, 1996

[51] Int. Cl.$^6$ .................................................. G01N 27/26
[52] U.S. Cl. ........................ 204/450; 204/600; 204/515; 205/742
[58] Field of Search .................................. 204/403, 450, 204/600, 742, 777.5, 515; 588/204

[56] References Cited

U.S. PATENT DOCUMENTS

| | | | |
|---|---|---|---|
| 3,637,473 | 1/1972 | Greenspan | 204/46 |
| 4,219,390 | 8/1980 | Stuart et al. | 204/54 |
| 4,422,917 | 12/1983 | Hayfield | 204/196 |
| 4,548,695 | 10/1985 | Bridger e al. | 204/149 |
| 4,596,641 | 6/1986 | Bridger et al. | 204/151 |
| 4,790,918 | 12/1988 | Bridger et al. | 204/149 |
| 4,912,286 | 3/1990 | Clarke | 174/110 A |
| 4,936,970 | 6/1990 | Weinberg et al. | 204/59 A |
| 4,954,966 | 9/1990 | Moreland et al. | 204/280 |
| 4,971,666 | 11/1990 | Weinberg et al. | 204/59 |
| 5,074,986 | 12/1991 | Probstein et al. | 204/130 |
| 5,137,608 | 8/1992 | Acar et al. | 204/130 |
| 5,264,018 | 11/1993 | Koenigsberg et al. | 71/63 |
| 5,378,328 | 1/1995 | Baltazar et al. | 204/105 R |
| 5,398,756 | 3/1995 | Brodsky et al. | 166/248 |
| 5,405,509 | 4/1995 | Lomagney et al. | 204/130 |
| 5,433,829 | 7/1995 | Pool | 204/130 |
| 5,435,895 | 7/1995 | Lindgren et al. | 204/516 |

(List continued on next page.)

FOREIGN PATENT DOCUMENTS

| | | | |
|---|---|---|---|
| 0 312 174 | 4/1989 | European Pat. Off. | B09B 5/00 |
| 866225 | 9/1981 | Russian Federation | A01G 25/00 |
| 2 240 550 | 7/1991 | United Kingdom | C02F 1/46 |

OTHER PUBLICATIONS

Yunker, S.B., Radovich, J. M., *Enhancement of Growth and Ferrous Iron Oxidation Rates of T. ferrooxidans by Electrochemical Reduction of Ferric Iron*. Biotech and Bioengineering vol. XXIII, pp. 1867–1875 (1986). Month Unavailable.

Thompson, B. G. *Communications to the Editor Electrochemical Ion Control in Batch Cultures of Saccharomyces cerevisiae NCYC 1018*. Biotech, and Bioengineering, vol. XXVII, pp. 1884–1888 (1986) I Month Unavailable.

Atlas, R. M., *Slick Solutions*, Chemistry in Britain, pp. 42–45 (May 1996).

Pineo, C. C., Beyke, G., Lageman, R.; *Heating Methods to Enhance Soil Remediation by Vacuum Extraction: Recent Field Applications in North America and Europe*, Risk Management Conference, Sicily, Italy, Nov. 1995, World Scientific Publishing Co., (1996). Month Unavailable.

*Primary Examiner*—Robert J. Warden
*Assistant Examiner*—Alex Noguerola
*Attorney, Agent, or Firm*—Limbach & Limbach L.L.P.; Seong-Kun Oh

[57] ABSTRACT

An integrated electrochemical soil remediation method and apparatus for treating contaminated soils, especially those contaminated with mixtures of nonvolatile organic contaminants, ionic contaminants and volatile organic compounds are disclosed. Remediation may be achieved by electrochemically enhancing biodigestion of organic contaminants (using microorganisms present in or added to soil), electrochemically removing ionic contaminants and electrochemically removing volatilized organic contaminants by applying a vacuum over the soil being treated, as dictated by the nature of contamination. Physicochemical conditions of the electrolyte and the soil are managed by monitoring and adjusting the electrolyte. Nutritional needs of microorganisms for biodigestion are adjusted as necessary through the electrolyte.

18 Claims, 3 Drawing Sheets

U.S. PATENT DOCUMENTS

| | | | |
|---|---|---|---|
| 5,443,700 | 8/1995 | Hirose | 204/149 |
| 5,458,747 | 10/1995 | Marks et al. | 204/130 |
| 5,476,992 | 12/1995 | Ho et al. | 588/204 |
| 5,489,370 | 2/1996 | Lomagney et al. | 204/627 |
| 5,510,033 | 4/1996 | Ensley et al. | 210/61 |
| 5,538,636 | 7/1996 | Grann et al. | 220/631 |
| 5,545,803 | 8/1996 | Heath et al. | 588/253 |
| 5,589,056 | 12/1996 | Pool | 205/766 |

ELECTROCHEMICALLY-AIDED BIODIGESTION OF ORGANIC MATERIALS

BACKGROUND OF THE INVENTION

1. Field of the Invention

The present invention relates to a method of remediation of soil containing organic compounds and ionic contaminants and more particularly to a method of electrochemically-enhanced remediation of soil contaminated with organic compounds and ionic species.

2. Description of the Related Art

Across the globe, soils are polluted with inorganic materials such as heavy metals, arsenical compounds, cyanides, selenides and radioisotopes. Additional contamination arises from organic compounds such as petroleum refinery products, coal tar and wood chemicals, solvents from the chlor-alkali industry, utilities producing gas and electricity, pesticide use and manufacture, residues from metal and munitions manufacturing, storage and disposal operations. Most of these activities have taken place close to major waterways and ports where land is either clayey or the ground water table is close to the surface or both. Clean up costs of contaminated soil and sediment in the U.S. alone is estimated to be $1.7 trillion for using conventional treatments such as soil washing, physical removal to land fill operations or various incineration options. Novel in situ processes for remediation of soil would therefore be of great benefit to society.

Of particular significance is polluted soils' threat to the earth's sub-surface waters which may lead to a potable water crisis on a scale reminiscent of the energy crisis of the 1970s. A recent Stamford University study points out that global drinking water resources are almost completely spoken for already. Yet, world population growth and continuing and widespread contamination by industrial, agricultural and military activities virtually ensure crisis in the next decade.

The breakdown of organic compounds in the soil by naturally occurring or cultivated bacteria and fungi is well known. Naturally occurring "biodigestion" has been used to decompose wastes since biblical times. The key elements to successful decomposition are heat, aeration, water and nutrients. An inadequate supply of one or more of these elements causes decomposition to slow and eventually stop.

The spectrum of biological species surviving in and around contaminated sites must be those selected naturally to survive in the presence of contamination. Some improvement in the local environmental conditions actually stimulates species growth and activity to such an extent that the contamination can be reduced to acceptable background levels and species actually thrive.

The application of electrochemical techniques for enhancing bioremediation is described by Kinsel and Umbreit, *J. Bacteriol.*, 87, 1234 (1964) and studied by Denisov, et al. in *Microbiologiya*, 47(3), 400 (1978). Kinsel and Umbreit used 90 mA electrical currents to enhance *Ferrobacillus sulfooxidans* yields sixfold compared to conventional cultivation processes.

Acar, et al. in U.S. Pat. No. 5,137,608 mention the introduction of bacteria and nutrients into soil to enhance electrochemical degradation of organic contaminants, suggesting that bacterial movement in the soil is achieved by an electroosmotic mechanism. Brodsky, et al. suggest the use of bacterial agents in carbon and other substrates in wells in contaminated soil. Brodsky, et al. teach that organic contaminants are transported in an electroosmotically-driven water front moving towards a cathode by an advection mechanism into bacteria-rich wells surrounding the electrodes for biodigestion.

Pool, in U.S. Pat. No. 5,433,829, incorporated herein in its entirety by reference, describes the deployment of electrodes in porous wells and a circulating electrolyte management system to provide nutrients, oxygen carriers, and a transport mechanism to biologically active species already present in or added through the wells to the soil.

One major obstacle to the advancement of electrochemical techniques for the removal of toxic substances from soil is the availability of rugged, nontoxic and inexpensive anodes, particularly for in situ processes where acidic conditions are present. Conventional electrodes are susceptible to attack by deleterious substances present or formed in the environment being treated. For example, when electrodes carry current via an aqueous electrolyte such as ground water, sea water, brines, mud, sewage sludge, wet sand or concrete, the environment around the anode acidifies (becomes a proton source) and that around the cathode becomes alkaline due to the presence of hydroxyl ions. Water moves toward the cathode by electro-osmotic pressure. If a strongly acidic or basic electrolyte is used or the electrolyte is well-stirred, the effect of these local changes in pH is minimized. However, where thorough mixing is difficult, as in electrolytes loaded with a relatively high solids content such as soils, muds, wet sands, industrial sludges, the effects of the local changes in pH can be very significant. The anodes can be attacked under local oxidative conditions and insoluble metal deposits may form at the cathodes, both of which effects can adversely affect the conductivity of the electrodes and thereby seriously diminish the efficacy of an electrochemical process.

In particular, the electrodes may malfunction or corrode and thereby act as a source of species that interfere with soil remediation or are contaminants in and of themselves. Therefore, a successful process must take into account the dynamics of the physicochemical conditions of the soil as electrochemical remediation is being carried out.

Industrial anodes developed for electrochemical processes are not necessarily suitable for electrochemical soil remediation techniques. Such anodes include precious metal and precious metal oxide-coated titanium or niobium, silicon, iron, carbon, lead and lead alloys and sacrificial anodes such as zinc, aluminum and ferrous alloys. Sacrificial electrodes and impressed current anodes made from lead and iron are unsuitable for electrochemical soil remediation due to their tendency to add toxic ions to the environment. Moreover, precious metal-coated electrodes are susceptible to attack by chloride and fluoride ions and some organic compounds such as carboxylic acids. Platinum coatings can be lost as soluble coordination compounds formed in the presence of specific reactants found in the contaminated area being treated. Fluoride as low as 500 ppm can be disastrous to titanium-based electrodes.

Electrodes used for cathodic protection include carbon granules surrounding a precious metal-coated titanium current collector. In these electrodes, the carbon granules serve to reduce current density and are consumed. However, the wear rate is severe as the carbon is oxidized to carbon dioxide and contact to the current collector is uneven at best.

Large carbon anodes and silicon-iron anodes suffer from "necking": accelerated wear around the electrical contact end of the anode. Though relatively inexpensive, use of these materials can in practice be a very expensive mistake.

Conventionally, a direct current voltage source is used to set up the driving current, thereby creating a constant flux of ionic contaminants through the soil. Direct current is also useful for vacuum extraction. For a given electrochemical technique, precious metal oxide-coated titanium and other conventional electrodes are designed to function as either an anode or a cathode, but not both. Indeed, such electrodes would be destroyed in an attempt to carry a fluctuating current, i.e., an alternating current, because a given electrode designed to serve as an anode when current flowed in a certain direction would not function as a cathode in response to the fluctuation of current direction and would instead dissolve or passivate.

When a.c. currents are used, metal oxides and hydroxides tend to deposit on conventional electrodes, interfering with sustained current. For example, sufficiently high temperatures can exist in the soil area adjacent to the electrodes that bicarbonate salts are decomposed.

One approach to eliminating build up of such insoluble metal deposits on the electrodes would be to simply use a reversible d.c. source in place of the a.c. source. Thus, during each portion of d.c. operation, current is switched so that each electrode spends a portion operating as an anode. The deposits that form around the electrodes during a.c. operation can be dissolved off during this period. However, as discussed above, the inability of conventional electrodes to function with current reversal prevents the use of alternating currents alone to avoid electrode corrosion.

Another significant issue in the advancement of electrochemical methods of soil remediation is electrolyte management. Generally, the purpose of the electrolyte is to enable collection of species removed from the contaminated environment, support electrokinetic flow through the soil while maintaining the physicochemical conditions of the soil. For example, it may desirable to control the pH in the soil and to replenish moisture in the soil being treated.

In electrochemical methods generally, ions migrate under the influence of the applied driving current. Thus, positively charged ions migrate as an acidic "front" through the contaminated medium toward the cathode while an alkaline "front" of negatively charged ions migrates in an opposing direction toward the anode. These fronts typically can meet within the contaminated soil as well as on the electrode surface, whereupon salts or alkaline hydroxide form. Precipitates disturb maintenance of the driving current supporting ion migration, so that ionic contaminants can no longer be removed effectively from the soil. The electrochemical process stops. Buildup of these precipitates can bring electrochemical remediation to a catastrophic halt.

Given the nature and extent of soil pollution around the world, it would be advantageous for an electrochemical soil remediation process to be capable of removing a wide variety of contaminants. For organic contaminants, structure, molecular size, water solubility and volatility are the most important characteristics to consider in designing and carrying out remediation techniques on soil and sediments.

Volatile organic compounds can be removed selectively from soils by vacuum extraction; heated vacuum extraction is economical and widely useful. Soluble organic compounds, especially those that are capable of existing as solubilized ionic species, such as water soluble dyestuffs, herbicides such as paraquat and diquat, phenolic compounds and ionic detergents, can be removed by electromigration.

Organic compounds that are neither water-soluble nor volatile respond to neither technique and therefore biodigestion may be useful. For example, some polymeric materials such as cellulose may be digested to carbon dioxide and water by common soil microorganisms. These organisms can also consume organic pollutants such as trinitrotoluene (TNT), a component of high explosives, polycyclic aromatic hydrocarbons found in coal tar residues, chlorinated hydrocarbons such as dichlorobenzene and some polychlorinated biphenyls (PCBs).

Some organic pollutants are either non-polar or too large to move at a reasonable rate electrokinetically. In situ remediation techniques for soils containing these pollutants exist and are compatible, if not synergistic, with electrochemical techniques. These in situ techniques include vacuum extraction of volatile solvents, digestion with bacteria, and use of sequestering agents that can be driven through the soil electrochemically. Electrochemical processing aids these techniques by providing heat generated by the voltage drop as a current passes through soil, so-called Joule heating. However, none has been successfully exploited because of the difficulties in removing contaminants having distinct and widely varying characteristics, inadequate electrodes and electrolyte management, as discussed above.

Accordingly, it is an object of the present invention to efficiently remove ionic and organic contaminants from soil, in in situ, continuous or batch modes, using microorganisms to digest nonvolatile organic contaminants, electrochemically stripping ionic contaminants, and vacuum extracting volatile organic compounds in various technique combinations as necessitated by the type(s) of contamination present.

SUMMARY OF THE INVENTION

The present invention achieves these and other objects by providing methods and apparatuses for treating contaminated soils, especially those contaminated with "mixed wastes": nonvolatile organic contaminants, ionic contaminants and volatile organic compounds.

Remediation may be achieved by electrochemically enhancing biodigestion of organic contaminants (using microorganisms present in or added to soil), electrochemically removing ionic contaminants and electrochemically removing volatilized organic contaminants by applying a vacuum over the soil being treated; one or more of these electrochemical techniques being used as dictated by the nature of the soil contamination. Physicochemical conditions of the electrolyte and the soil are managed by monitoring and adjusting the electrolyte. Nutritional needs of microorganisms for biodigestion are adjusted as necessary through the electrolyte.

One embodiment of the present invention relates to an electrochemical method for removing heavy metal or organic contaminants from soil using microorganisms in which an anode and a cathode are enclosed in wells in the contaminated soil. The wells are permeable to ions, water and microorganisms that can consume the contaminants. A circulating electrolyte is supplied to the contaminated soil via the electrodes for maintaining physicochemical conditions, such as pH and moisture, in the soil and to remove contaminants accumulating in the soil adjacent to the electrodes. A potential difference is established between the anode and the cathode by an applied d.c. current. The current induces transport through the soil of ions according to their charge and of microorganisms by electrophoresis and heats the contaminated soil to promote decomposition of the contaminants by the microorganisms. For aerobic decomposition processes, oxygen sources may be provided.

According to another embodiment of the present invention, when treating soil contaminated with ionic contaminants, volatile and nonvolatile organics, in addition to the above-described steps, the soil is heated as a result of the resistance of the soil to the applied current and a vacuum is applied adjacent to the soil to extract volatilized compounds. Soil heating may be used to enhance biodigestion.

In a further embodiment of the present invention, the polarity of the current applied to the electrodes initially is reversed to solubilize salts or precipitates accumulating at said electrodes when treating ionically contaminated soils.

In carrying out the present invention, natural biodigestion by microorganisms is stimulated using electrochemical techniques resulting in enhanced utility, efficiency and control.

Naturally occurring microorganisms or selectively cultivated species can be used where present or injected into another environment where bioremediation is desired. Also, it is possible to inject and electrochemically transport into the soil supporting nutrients or enzymes that aid biodigestion processes.

BRIEF DESCRIPTION OF THE DRAWINGS

The present invention will be further described in connection with the drawings of the following figures in which like reference numerals refer to the same element and wherein.

DESCRIPTION OF THE PREFERRED EMBODIMENTS

Methods according to the present invention include the following combinations of techniques: 1) electrochemically enhanced biodigestion (i.e., consumption or decomposition of organic contaminants by microorganisms) and electrochemical remediation (i.e, removal of ionic contaminants electrochemically) with electrolyte management; 2) vacuum-assisted electrochemical remediation (i.e., electrochemical remediation to remove volatile organics and ionic contaminants) with electrolyte management; and 3) electrochemically enhanced biodigestion, electrolyte management and vacuum-assisted electrochemical remediation. As a result, methods according to the present invention can utilize the various techniques to successfully treat contaminated soils, including those several distinct types of contaminants, for which prior art techniques are ill-equipped, considerably less efficient or otherwise unsuitable. The various aspects of these methods are discussed more fully below.

The phrase "ionic species" is used herein to denote charged or polarizable particles, such as metal cations— including heavy metals—, anionic complexes or radicals. The ionic species may also be organic or inorganic compounds. Water-soluble ions or organic contaminants that can be converted to soluble ions by the passage of protons or hydroxyl ions from the electrodes are also considered ionic species for purposes of the present invention.

Organic contaminants sought to be removed in methods of the present invention include volatile organic compounds such as conventional solvents and relatively nonvolatile compounds such as monocyclic or polycyclic aromatic hydrocarbons or halocarbons, such as dichlorobenzene.

Ionic contaminants physically adsorbed, i.e., ionically bonded, or solubilized in pockets of water or moisture accommodated within the lattice structure of the contaminated medium can also be removed from soil by methods according to the present invention.

Methods according to the present invention are capable of treating soils contaminated with "mixed wastes": nonvolatile organic contaminants, ionic contaminants including radionuclides, and volatile organic compounds.

In general, contaminated soils suitable for treatment according to the present invention include porous soils and may be in bulk or particulate, e.g., clods of soil. Contaminated soil suitable for treatment according to the present invention also includes sand, mud, dredgings, industrial sludges and the like.

While undergoing treatment, the soil may remain in situ so that its physical disposition need not be changed in the course of treatment according to the present invention. Alternatively, the soil may be put into a reaction vessel or other container for treatment.

Figure 1:
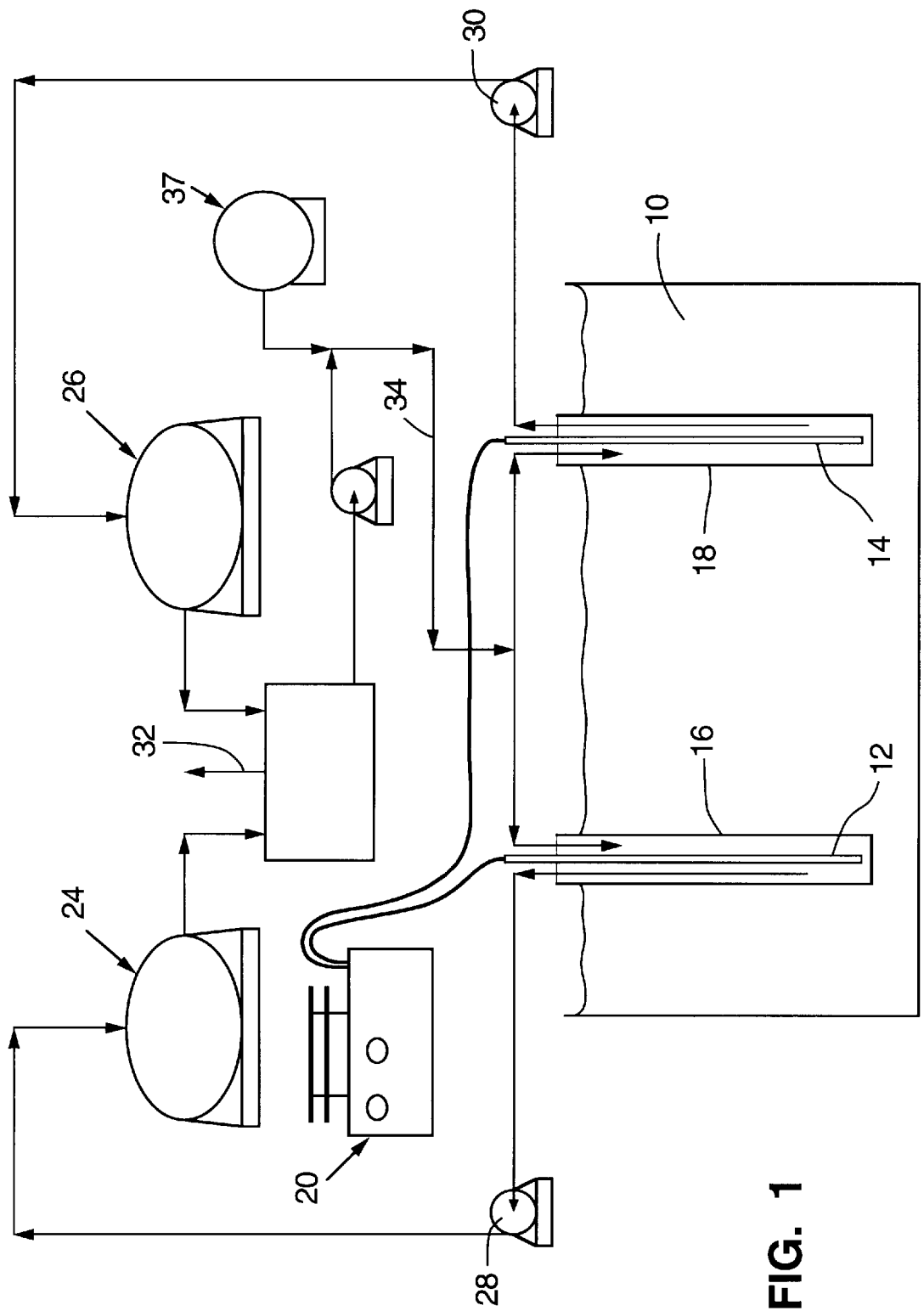
FIG. 1 is a schematic of an exemplary apparatus capable of carrying out in situ method according to the present invention.

Techniques for in situ treatment of contaminated soil will be described first with reference to FIG. 1.

In situ treatment according to the present invention generally involves setting up and maintaining a driving current of sufficient magnitude across contaminated soil 10 to cause migration of anionic and cationic species to a desired location, e.g., an electrolyte. This migration may be accomplished by creating an electrical circuit which includes the contaminated soil.

The actual configuration of the circuit depends in large part on the physical disposition on the contaminated soil. Exemplary anode 12 and cathode 14 are positioned inside wells 16, 18 dug into the contaminated soil to be treated. These electrodes may be rods, tubes, cables, panels or other forms known in the art. The electrodes are connected to a power supply 20. Power supply 20 connects anode 12 and cathode 14 by conventional means and establishes a driving current across the contaminated soil. Conventional voltage- or current-regulated power mains or locally generated power supplies and any number of current or voltage control systems may be utilized for this purpose. Power supplies may be controlled remotely to provide the desired driving current in the contaminated soil.

Figure 2:
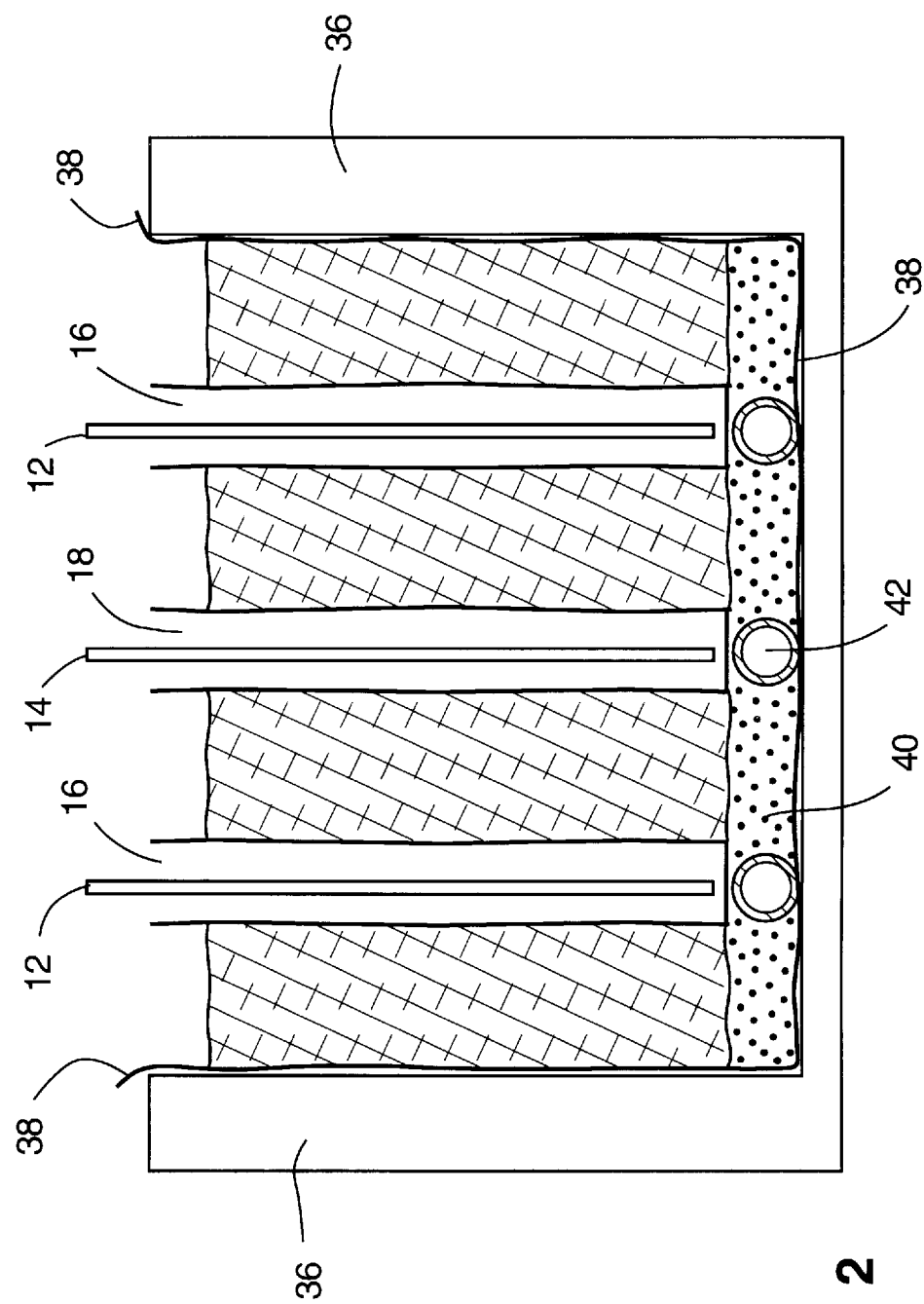
FIG. 2 is a schematic illustration of an exemplary apparatus for carrying out a method according to the present invention on a batch of contaminated soil.

To carry out a method for treating contaminated soil in a batch mode, as shown in FIG. 2, contaminated soil 10 is held in a reactor or tank 36 lined with polyethylene 38 and a course sand base 40 and fitted with electrolyte drainage pipes 42. Electrodes 12, 14 are arranged in wells 16, 18 formed in the batch of soil. Power supply, electrolyte management system and pumps are not shown. Preferred electrode spacing for batch mode operation is that which permits rapid decontamination of the soil, therefore relatively close spacings (15–30 cm) are suitable.

If multiple anodes and cathodes are used for either batch or in situ processing, more than one power supply may be used to connect all of the anodes and cathodes in order to establish a uniform electrical field of sufficient strength across the contaminated soil being treated at a given time.

Non-corroding electrodes are especially preferred for use in the methods according to the present invention as they may remain in the soil for extended periods of time without contaminating the soil. Also, desirably, the anodes and cathodes can sustain a sufficiently high current density to carry out remediation without excessive heat generation. In a preferred embodiment, anode 12 and cathode 14 are cables having a conductive core coated by an acid-resistant polymeric or ceramic material. An example is an aluminum or a copper cable having a $Ti_nO_{2n-1}$ (e.g., $Ti_4O_7$) outer coating, such as those sold under the trademark EBONEX, commercially available from CBC Electrodes of Orinda, Calif. Other examples of suitable conductive materials are mild steel, carbon or titanium. The coating serves as the active electrode surface, through which microorganisms, nutrients and mobilized contaminants may pass.

Figure 3:
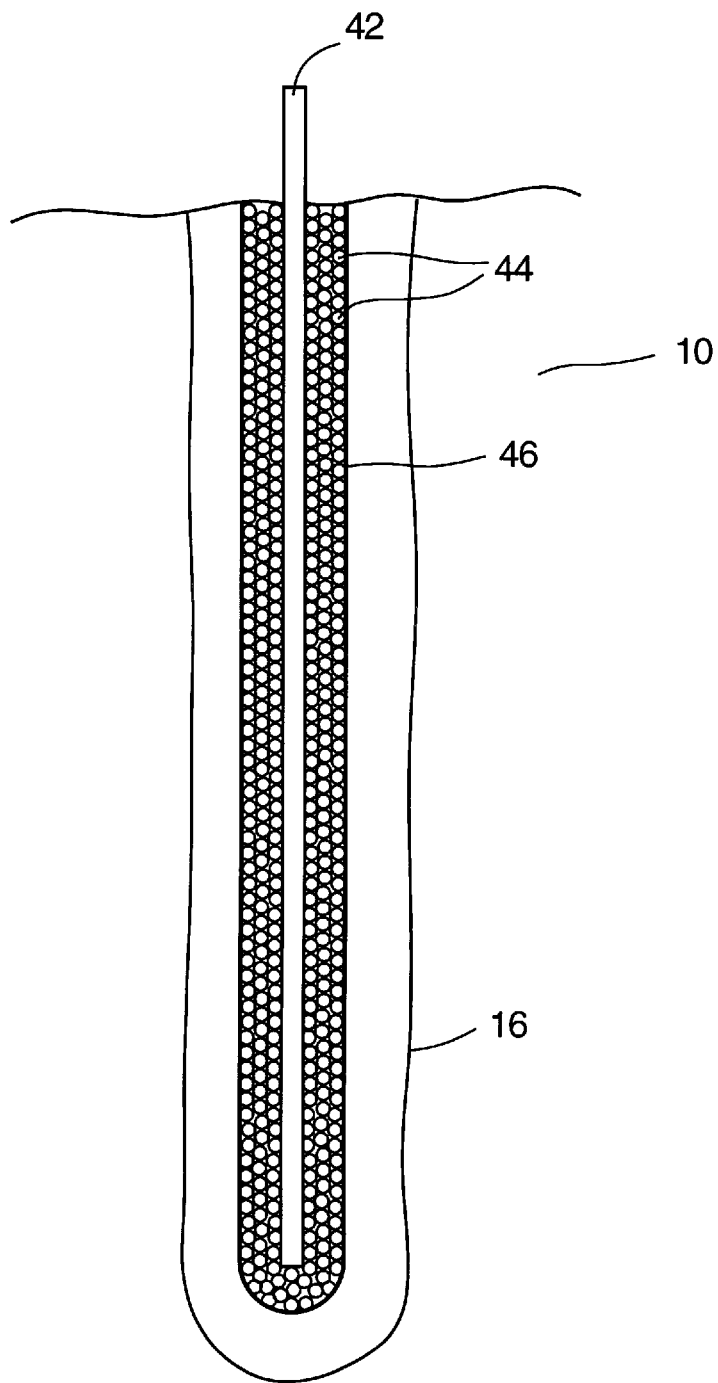
FIG. 3 is an enlarged partial view of an electrode suitable for use in a method according to the present invention.

FIG. 3 is an enlarged cross-sectional view of an electrode suitable for use in methods according to the present invention for treatment of soils that tend to form nonconductive deposits at the electrodes. Typically, the length of current collector 42 is surrounded by a particulate material 44 in inert casing 46. Particulate material 44 is used to increase the surface area of the electrode in order to reduce the effect of deposits of insoluble metal compounds such as calcium bicarbonate forming on the electrodes. A suitable particulate material is coke granules (20 mesh to about ¼" diameter), also known as coke "breeze."

Another benefit of utilizing electrodes based on the preferred $Ti_4O_7$ composition is that a single electrode may function as an anode or as a cathode as needed during soil treatment. For example, advantage may taken of this ability by applying an alternating current so that for periods of time, current flow is in a direction reverse to that applied to support soil decontamination. As a result of the reversal of the current, electrodes are cleaned of salt buildup without dissolving the electrode material in its place, as would otherwise happen. A dc current, e.g. where several minutes, hours or days pass before the polarity is adjusted can accomplish this purpose.

Although several figures herein show a single anode and a single cathode, it is possible and may be particularly desirable to carry out the present invention utilizing several electrodes, i.e., an electrode array. For example, multiple anodes and cathodes may be arranged to establish a uniform field of sufficient strength through the soil. Tetragonal and hexagonal electrode arrays can be effective in this regard. Suitable spacing between electrodes is that which will promote an adequate rate of remediation without requiring so many electrodes as to be cost prohibitive. In a hexagonal array of six electrodes, a spacing of about 1.5 m–2.5 m is adequate for an in situ operation. Where the treatment is vacuum assisted, a vacuum well may be located adjacent to the electrode array serving as a site for withdrawal of volatilized organic contaminants. For example, the vacuum well can be positioned at the center of the array.

For electrochemical biodigestion of organic compounds and electrochemical remediation to remove ionic contaminants, applied current is desirably between about 2 $A/m^2$ and about 20 $A/m^2$; preferably, the applied current is about 8–10 $A/m^2$. The potential difference established between the electrodes generally should be at least about 20 volts/m in order to support ionic transport and electrophoretic transport of the microorganisms in the soil, but the magnitude of the potential difference is not a significant factor on the cultivation or activity of the microorganisms. Potential differences as high as 100 volt/m were not observed to be adverse to the performance of the microorganisms.

Methods according to the present invention may be carried out using an alternating current for vacuum assisted electrochemical remediation, with or without biodigestion. A direct current mode is needed to remove ionic contaminants from soil, enables electrode cleaning and enhances microorganism cultivation and activity.

A suitable electrolyte is a liquid, such as water, that will support electrochemical processes in the soil being treated, provide a means to replenish moisture in the soil and an electrophoretic mechanism by which the microorganisms are dispersed into the contaminated soil, enhance electrical conductivity of the soil, solubilize ionic contaminants, provide nutrients to the microorganisms and conditioning agents as necessary into the soil. Water can be directed to the electrolyte reservoir tanks or pumped directly at the electrode wells.

Typically, contaminated soil has some level of moisture, since some water penetrates from the surrounding environment. Water and any contaminants solubilized therein migrate through the contaminated soil from the area surrounding the anode as hydrated hydrogen ion and appearing at the cathode as hydrogen gas. Because water facilitates the migration of the ionic species through the contaminated soil and helps control the increasing acidity therein, especially near the anode, it is desirable to replenish the water in the contaminated soil over time. Also, moisture is essential to the growth and sustenance of microorganisms utilized in the biodigestion techniques according to the present invention. Replenishment with water substantially free of the ionic species sought to be removed according to the present invention is especially desirable. The water added for replenishment need not be completely "deionized", since the presence of certain ions may assist in balancing pH and balancing conduction.

As the present invention is carried out, concentration of ionic species increases over time both in the electrolytic material and at its interface with the cathode. The "loaded" electrolyte may be disposed of or, preferably, is regenerated to permit recycling back to the electrodes. Flow of water within the contaminated soil provides an effective mechanism by which the ionic contaminants may be downloaded into a form that is much more conveniently handled and disposed of than the originally contaminated soil. Once downloaded, these ionic contaminants may provide feedstocks for processes.

The pH of the electrolyte (and the soil being treated) may be adjusted depending on the characteristics of the ionic species being removed. Neutral or acidic pH is generally suitable. Where anions such as cyanide are contaminants, the electrolyte should be maintained sufficiently alkaline to avoid liberation of hydrogen cyanide gas during treatment according to the present invention. Likewise, where species such as phenol are contaminants, a relatively acidic pH in the electrolyte is preferred. In methods according to the present invention, adjustment of the pH is achieved simply and efficiently by the addition or removal of acid or base as necessary. Adjustment of pH may be accomplished sequentially, for example, first, to allow for removal of certain ionic species under relatively acidic and then, removal of other ionic species under basic conditions, as desired. Certain microorganisms thrive at pH levels of 1.

Referring again to FIG. 1, electrolyte management obtaining all of the above-described functions may be achieved directly and easily by an electrolyte management system which typically includes one or more electrochemical ion exchange units 24, 26 and may include one or more pumps 28, 30 to assist with electrolyte flow therein and to the electrodes. Such an electrolyte management system permits regeneration of the electrolyte by separating accumulated ionic contamination therefrom, which contamination may be recovered in a stream 32. The regenerated electrolyte may be recycled back to each of the electrodes for additional soil decontamination via stream 34. The electrolyte management system also provides a convenient point in the apparatus to adjust pH and soil moisture (via line 35) and add nutrients (via nutrient reservoir 37) as desired during treatment.

When current flows, ionic species will migrate according to their charges and the soil will be heated gently. Ionic species will migrate under the influence of the driving current through the contaminated soil into the electrolyte. The driving current creates positively and negatively charged streams or "bands" moving through the soil. Water-solubilized ionic contaminants are swept up in the charged streams and are ultimately dissolved in the electrolyte. Levels of ionic contamination are thus reduced in the soil at large and may be collected in a form much more easily disposed of than the contaminated soil. Another possible use for the recovered contaminants is as a feedstock to other processes.

The soil is gently heated as a result of its resistance to the flow of the applied current, i.e., Joule heating. Heating in this manner provides a useful but simple means to promote the activity and growth of microorganisms and decomposition of organic compounds not otherwise being removed. Operating temperatures are easy to control by adjustment of the applied current. This is in distinction to conventional processes using RF heaters or steam injection by which the soil (including the organisms which accomplish biodigestion) is actually sterilized due to the high temperatures achieved. Generally, for the present invention, soil temperatures achieved as a result of heating should be no more than those at which the microorganisms being used thrive. Typically, the soil temperatures can be between about 30° C. and about 70° C. As a further benefit, Joule heating is also adequate to volatilize certain organic contaminants.

In vacuum-assisted electrochemical remediation techniques according to the present invention, vacuum may be applied adjacent to the soil to draw off organics volatilized as a result of the Joule heating. For example, a vacuum extraction well located centrally in the electrode array may be used for this purpose. The magnitude of the vacuum utilized need be only that which is sufficient to draw off volatilized organics, e.g., as low as 15 in Hg to about 30 in Hg is adequate. The vacuum need not be so strong as to extract organics from the soil. Addition of the vacuum does not inhibit the decomposition activity of microorganisms, but rather enhances such activity by promoting aeration of the soil. Vacuum may be applied through use of conventional equipment.

For methods according to the present invention in which organic compounds are decomposed by microorganisms, either naturally occurring levels of bacteria may be enhanced or reinstated into contaminated soils or special bacterial strains may be introduced into the soil. Bacteria that feed on organic molecules need support typically in the form of oxygen, water, nutrients and essential elements such as nitrates, phosphates or sulfates. Growth of colonies is also encouraged by raising the temperature, e.g., to around 40° C., and adding some easily digested organic materials such as starches and polysaccharides and other plant residues. In some cases, small molecules such as 3–6 carbon carbonyl compounds such as chlorinated hydrocarbons may be used. Following the progress of bioactivity is accomplished by sampling the bacterial count, measuring the release of carbon dioxide, and monitoring pollutant profiles and temperature gradients.

Suitable microorganisms for such methods according to the present invention include aerobic bacteria such as *Thiobacillus ferrooxidans* (this species is acidophilic) or *Staphylococcus cerevisiae*.

Nutrients for such microorganisms include water-soluble nitrates, phosphates and oxy anions (such as peroxides) that can move through the soil as the electrolyte flows through the soil. A preferred phosphate is sodium hexametaphosphate since it is not readily adsorbed onto the soil. These substances can also serve as oxygen sources for the microorganisms. Generally, at least 1 ppm oxygen in water is desirable for carrying out aerobic biodigestion. Nutrients at about 3–100 ppm level is suitable.

Various aspects of the methods according to the present invention are further illustrated in the following examples, none of which is intended to limit the scope of the invention.

EXAMPLE 1

Three thousand cubic meters of soil contaminated with a mixture of mineral oils, naphthalene and volatile monocyclic aromatic solvents was treated using vacuum-assisted electrochemical remediation to remove volatile organic species and biodigestion to decompose other organic species. This example s hows the compatibility of these techniques.

Six iron rebar/coke breeze electrodes were arranged in a hexagonal array, separated from each other by two meters. At the center of the array, a vacuum well (5–10 cm diameter) was located. The well was the same depth (9 meters) as the electrodes. A 10 mA ac current was applied for three months. Vacuum was about 28 in Hg. The results after three months measured by gas chromatograph and FTIR spectroscopy are shown below in Table 1.

TABLE 1

|  | Initial Concentration ($\mu$g/l) | Final Concentration ($\mu$g/l) |
|---|---|---|
| Organic Contaminant |  |  |
| Benzene | 610 | <0.20 |
| Toluene | 1,900 | <0.20 |
| Ethylbenzene | 2,400 | <0.20 |
| Xylenes | 8,500 | <0.20 |
| Total monocyclic aromatics | 13,410 | na |
| Naphthalene | 310 | <0.20 |
| Mineral oil | 7,300 | <50 |

As can be seen, the concentration of relatively volatile organic compounds (benzene, toluene, xylenes) was dramatically reduced. Likewise, mineral oil and naphthalene, nonvolatile organics, were also removed.

EXAMPLE 2

Samples of soil from a munitions site that had a devastating explosion in 1918 were treated with an electrochemically assisted biodigestion/electrolyte management technique according to the present invention. The soil was contaminated with heavy metals, organic arsenic and trinitrotoluene and its breakdown products as shown in Table 2.

TABLE 2

| Toxin | As | Cd | Cr | Cu | Hg | Ni | Pb | Zi |
|---|---|---|---|---|---|---|---|---|
| mg/kg | 270–780 | 7–17 | 30 | 63–250 | 0.14–0.3 | 37–54 | 88–12,000 | 37–580 |

The soil samples were sieved into coarse, medium and fine fractions, most of the metals except lead and arsenic were naturally occurring minerals that were removed by wet sieving and gravitational separation. Also removed were the large pieces of TNT that made the original samples of soil inhomogeneous. As a result, the average contaminant concentration was less than <500 mg TNT/kg soil or equivalents.

The wet sieved materials (i.e., those essentially free of heavy metal ores and large pieces of TNT but still containing the leachable organic arsenic compounds) was treated in a batch reactor similar to that shown in FIG. 2.

The pretreated fine soil material was fed into a steel vessel (6 m×2.5 m×2 m) that was lined with wood and polyethylene sheets. Anode and cathode compartments were fitted with filter medium and filled with water. The anodes were made from activated titanium and the cathodes from stainless steel. Both anode and cathode compartments (porous polyethylene) were fitted to anolyte and catholyte circulation loops enabling the electrolytes to be continuously treated.

Resistivity during the period was between 10 to 30Ω, current density was 1–2 A/m$^2$ and voltage was between 20–50 v/m. The electrical power supply was rated at 10 kVA.

During the treatment, the ionic contaminants migrated under the influence of the electrical field and were captured in the electrolytes in the anode and cathode compartments. Treatment of the electrolytes consisted of removal of arsenic and heavy metals by selective electrical ion exchange using several different ion exchange resins. The pH of the electrolytes was maintained at 7.

Soil was heated to 25°–30° C. as the result of Joule heating (from the passage of current via the electrodes) sufficient to enhance biodigestion but conservative enough not to threaten the TNT. Periodically, sodium hexametaphosphate and nitrate were added to the electrolytes and transported through the soil under the influence of the electric field as nutrients for the microorganisms naturally present in the contaminated area. After three months, the following results (Table 3) were obtained:

TABLE 3

| Applied Energy kWh/m$^3$ | TNT mg/kg | DNT mg/kg | DNB mg/kg | PAH mg/kg | Organic As mg/kg |
|---|---|---|---|---|---|
| 0 | 49 | 188 | 553 | 40 | 11 |
| 31 | 70 | 10 | 2.7 | nd | nm |
| 49 | 10.1 | 3.3 | 6.8 | nd | 0.11 |

TNT = trinitrotoluene
DNT = dinitrotoluene
DNB = dinitrobenzene
PAH = polycyclic aromatic hydrocarbons
nd = not detected
nm = not measured As can be seen from these results, vacuum-assisted electrochemical remediation in combination with biodigestion were not only compatible, but effective means for handling such mixed wastes. Vacuum was provided via a buried porous pipe positioned between the electrodes in the soil.

EXAMPLE 3

A test site contaminated with diesel was heated with 10 mA ac current from wells arranged in a hexagonal electrode pattern inserted to a depth of 9 meters, a centrally-located vacuum well was inserted in the center of the electrode array. Electrode spacing was about two meters. Vacuum was about 28–30 inches Hg. The results of the process on the concentrations of diesel at 1-, 2- and 3 m depths in the soil before and after treatment and corresponding soil temperatures achieved are shown below in Table 4.

TABLE 4

| Depth (m) | Initial Concentration (mg/kg) | Final Concentration (mg/kg) | Removal Efficiency | Temp °C. |
|---|---|---|---|---|
| 1 | 9000 | 220 | 97.6% | 40 |
| 2 | 9000 | 9 | 99.9% | 55 |
| 3 | 9000 | 18 | 99.8% | 70 |

The results indicate the value of gentle soil heating achieved in the present invention: although relatively more contamination was left at the lowest temperature, the amount of contamination in the soil was dramatically reduced (97.6% removal efficiency).

EXAMPLE 4

Samples of soil from a gas-producing site were contaminated with Prussian blue dye (potassium ferrous ferricyanide), cadmium, arsenic, phenols and a mixture of polycyclic aromatic hydrocarbons and tar from the coking of coal.

Electrochemical remediation with electrolyte management was used to remove cyanide in the Prussian blue component, cadmium, arsenic and the phenols which, in an alkaline environment, exist as phenate ion.

Twenty kilogram soil samples were treated. The soil was placed in a small batch reactor as shown in FIG. 2.

Prussian blue was hydrolyzed under alkaline conditions to form CN$^-$ anions, iron and potassium cations which electromigrate toward the appropriate electrodes. The blue color of the contaminated soil changed to a normal brown color as the alkaline front from the catholyte moved through the soil. Some metals and arsenic accumulate at the electrodes and were removed to the electrolyte compartments. Treatment continued for 400 hours. The power used was equivalent to 696 kWh/m$^3$. The results are shown below in Table 5.

TABLE 5

| Contaminant | Initial Concentration (ppm) | Final Concentration (ppm) | Removal Efficiency |
|---|---|---|---|
| Phenol | 340 | 93 | 73% |
| Cyanide | 32,000 | 1200 | 96% |
| As | 15 | 9.3 | 38% |
| Cd | 0.9 | 0.4 | 56% |

Although the conditions are not optimized for heavy metal removal (which would work better under more acidic conditions), the decontamination of the soil was significant and rapid.

EXAMPLE 5

Soil samples as described in Example 4 were treated under the same conditions in that example, except the anolyte and catholyte solutions were maintained in an acid condition to improve removal efficiency for the cadmium and arsenic. A vacuum well was formed in the center of the soil compartment, and a vacuum applied from the laboratory vacuum pump to trap any free HCN or cyanogen liberated from residual cyanide left in the soil. The soil was heated to 40° C. by Joule heating.

The residual cyanide and phenol were removed by vacuum-assisted electrochemical remediation. Residual metals were also removed. Levels of both arsenic and cadmium were less than 1 ppm after 100 hours of treatment.

EXAMPLE 6

This example illustrates electrochemically enhanced biodigestion, electrolyte management and vacuum-assisted electrochemical remediation achieved in a single treatment.

Soil contaminated with polycyclic hydrocarbons and tar residues is added to the soil described in Example 4. The added soil contains microorganisms. Five grams of CALGON detergent (potassium hexametaphosphate) is added per kilogram of soil. The experiment is run for 200 hours under vacuum and the temperature is maintained at 30°–40° C. The pH of the soil is maintained at 6–7 using electrolyte conditioning units. Table 6 shows exemplary results.

TABLE 6

| Contaminant | Phenol | As | Cd | PAH | cyanide |
|---|---|---|---|---|---|
| Initial concentration (ppm) | 93 | 9.3 | 0.4 | 300 | 1200 |
| Final concentration (ppm) | ND | 0.1 | 0.2 | 20 | 12 |

The experiment although not optimized indicates that mixed contamination can be removed using a combination of the electrolyte management, heated vacuum and electrochemically supported bioremediation.

While the present invention is disclosed by reference to the preferred embodiments and examples set forth above, it is to be understood that these examples are intended in an illustrative rather than a limiting sense. It is contemplated that modifications will readily occur to those skilled in the art, which modifications will be within the spirit of the invention and with scope of the appended claims.

We claim:

1. An electrochemical method for removing ionic and organic contaminants from soil, comprising the steps of:
   a) inserting an anode and a cathode in wells in soil containing ionic and organic contaminants, wherein the wells are permeable to ions, water and microorganisms that consume the organic contaminants;
   b) supplying an electrolyte to the contaminated soil via the anode well or the cathode well or both;
   c) introducing said microorganisms into the soil;
   d) establishing a potential difference between the anode and the cathode by an applied current to induce transport through the soil of ions according to their charge and of microorganisms by electrophoresis;
   e) controlling the heat generated, oxygen content and pH in the soil in a range sufficient to promote the decomposition of the contaminants by the microorganisms, but not inactivate the microorganisms; and
   f) collecting electrolyte from areas adjacent to the cathode and the anode and treating the collected electrolyte to remove ionic contaminants.

2. A method according to claim 1, further comprising a step g) of replenishing nutrients in the soil.

3. A method according to claim 1, wherein step e) comprises adding an oxygen-containing electron acceptor.

4. A method according to claim 3, wherein the oxygen-containing electron acceptor comprises a nitrate, a phosphate, an oxy anion or mixtures thereof.

5. A method according to claim 1, wherein step e) further comprises the step of adjusting the magnitude of current supplied to the anode and the cathode or adjusting the conductivity of the electrolyte by the addition of chemical agents to control the amount of said heat generated.

6. A method for removing contaminants from soil, comprising the steps of:
   a) inserting an anode and a cathode into soil contaminated with volatile organic compounds and ionic species, wherein said anode and said cathode are positioned in wells formed in the soil and said wells are permeable to ions, water and microorganisms;
   b) providing an electrolyte to the soil via said electrode wells;
   c) introducing microorganisms into the soil;
   d) applying and controlling a current to said anode and cathode that is sufficient to control the heat generated, oxygen content and pH in said soil to promote the decomposition of the contaminants by the microorganisms, but not inactivate the microorganisms;
   e) applying a vacuum to extract volatilized compounds from the soil; and
   f) collecting electrolyte from said wells and treating said collected electrolyte to maintain physicochemical conditions within the soil that enable contaminant removal and to remove said contaminants from the collected electrolyte.

7. A method according to claim 6, further comprising the step g) of reversing the polarity of the current applied to the electrodes in step c) to solubilize salts or precipitates accumulating adjacent to the anode and the cathode.

8. A method according to claim 6, wherein the electrodes further comprise a high surface area nonconductive material surrounding a conductive core.

9. A method of electrochemical bioremediation, comprising the steps of:
   enclosing an anode and a cathode in wells in soil containing ionic, heavy metal or organic contaminants, wherein the wells are permeable to ions, water and microorganisms that consume the contaminants;
   electrochemically transporting ions through the soil according to ionic charge;
   introducing microorganisms into the soil;
   electrophoretically dispersing microorganisms through the soil to the locations where organic contaminants are present; and
   contacting the microorganisms with said organic contaminants while maintaining the physicochemical conditions in the soil for a time sufficient for said microorganisms to consume said contaminants.

10. An apparatus for bioremediation of soil contaminated with ionic or organic contaminants, comprising:
   a plurality of electrodes including an anode and a cathode;
   a power supply for establishing a dc potential difference across the soil between the anode and the cathode that causes electrophoretic transport of microorganisms in the soil and migration of ionic species in the soil, the power supply further configured for controlling soil temperature within a range that enhances consumption of the contaminants by the microorganisms without inactivating the microorganisms;
   means for introducing the microorganisms into the soil;
   means for enclosing the electrodes, wherein the means for enclosing the anode and the cathode is permeable to ions, water and microorganisms; and
   means for electrochemically managing the physicochemical conditions in the soil.

11. An apparatus according to claim 10, further comprising means for applying a vacuum adjacent to the contaminated soil.

12. An electrochemical method for removing ionic and organic contaminants from soil, comprising the steps of:
 a) inserting an anode and a cathode in wells in soil containing ionic and volatile and nonvolatile organic contaminants, wherein the wells are permeable to ions, water and microorganisms that consume the nonvolatile organic contaminants;
 b) supplying an electrolyte including the microorganisms to the contaminated soil via the anode well or the cathode well or both;
 c) establishing a potential difference between the anode and the cathode by an applied current to induce transport through the soil of ions according to their charge and of microorganisms by electrophoresis and to heat the contaminated soil to promote the decomposition of the nonvolatile contaminants by the microorganisms, but not inactivate the microorganisms;
 d) controlling the heat generated, oxygen content and pH in the soil in a range sufficient to promote the decomposition of the contaminants by the microorganisms, but not inactivate the microorganisms;
 e) collecting electrolyte from areas adjacent to the cathode and the anodes and treating the collected electrolyte to remove ionic contaminants;
 f) applying a vacuum sufficient to induce air flow into the soil and withdraw volatilized organic contaminants from the contaminated soil; and
 g) reversing the polarity of the current applied to the electrodes in step a) to solubilize salts or precipitates accumulating at the anode and the cathode.

13. A method according to claim 12, further comprising the step of replenishing nutrients and oxygen sources in the soil.

14. A method according to claim 12, wherein the step of providing an oxygen source comprises adding an oxygen-containing electron acceptor.

15. A method according to claim 14, wherein the oxygen-containing electron acceptor comprises a nitrate, a phosphate, an oxy anion, or mixtures thereof.

16. A method according to claim 12, further comprising the step of adjusting the temperature of the heated soil by adjusting the magnitude of current supplied to the anode and the cathode or by adjusting the conductivity of the electrolyte by the addition of chemical agents.

17. A method for vacuum-assisted electrochemical remediation of moist soil containing volatile organic compounds and water-insoluble compounds, comprising the steps of:
 a) inserting electrodes into wells formed in soil contaminated with a volatile organic compound, the wells being permeable to ions, water and microorganisms;
 b) heating the soil with an alternating current to a temperature sufficient to volatilize the volatile organic compounds and water present as moisture in the soil;
 c) applying a vacuum adjacent to the soil to withdraw the volatilized organic compounds from the soil; and
 d) switching from the alternating current to a direct current to dissolve the nonconductive water-insoluble deposits adjacent to the electrodes.

18. An apparatus for vacuum-assisted remediation of soil contaminated with organic contaminants, comprising:
 electrodes comprising an electrically conductive core and a high surface area nonconductive material and being capable of acting as an anode when a current has a polarity on one direction and as a cathode when the current has the reverse polarity, wherein the electrodes are in wells, the wells being permeable to ions, water and microorganisms;
 a power supply for establishing a dc potential difference across the soil between the electrodes;
 means for electrochemically controlling the heat generated, moisture and pH in the soil in a range sufficient to promote the decomposition of the contaminants by microorganisms, but not inactivate the microorganisms; and
 means for withdrawing by vacuum organic contaminants volatilized by heat generated by current flow through the soil.

* * * * *